(12) United States Patent
Silva et al.

(10) Patent No.: US 11,424,672 B2
(45) Date of Patent: Aug. 23, 2022

(54) CURRENT LIMITING FOR A BOOST CONVERTER

(71) Applicant: QUALCOMM Incorporated, San Diego, CA (US)

(72) Inventors: Pradeep Silva, San Diego, CA (US); Subbarao Surendra Chakkirala, San Jose, CA (US); Sherif Galal, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 3 days.

(21) Appl. No.: 17/159,082

(22) Filed: Jan. 26, 2021

(65) Prior Publication Data

US 2021/0234457 A1    Jul. 29, 2021

Related U.S. Application Data

(60) Provisional application No. 62/966,449, filed on Jan. 27, 2020.

(51) Int. Cl.
*H02M 1/32* (2007.01)
*H02M 3/155* (2006.01)
*H02M 1/00* (2006.01)

(52) U.S. Cl.
CPC ............ *H02M 1/32* (2013.01); *H02M 3/155* (2013.01); *H02M 1/0009* (2021.05)

(58) Field of Classification Search
CPC ....... H02M 1/32; H02M 3/155; H02M 1/0009
See application file for complete search history.

(56) References Cited

U.S. PATENT DOCUMENTS

| 8,421,432 | B2 | 4/2013 | Hawkes | |
|---|---|---|---|---|
| 10,432,087 | B2 | 10/2019 | Krabbenborg | |
| 2007/0252567 | A1* | 11/2007 | Dearn | H02M 3/156 |
| | | | | 323/282 |
| 2018/0262106 | A1* | 9/2018 | Chakkirala | H02M 3/158 |
| 2018/0316273 | A1 | 11/2018 | Chen et al. | |
| 2019/0319540 | A1 | 10/2019 | Arno | |
| 2020/0119641 | A1* | 4/2020 | Liang | H02M 3/157 |

FOREIGN PATENT DOCUMENTS

| CN | 103701312 A | 4/2014 |
|---|---|---|
| CN | 207304403 U | 5/2018 |

OTHER PUBLICATIONS

International Search Report and Written Opinion—PCT/US2021/015289—ISA/EPO—dated Apr. 28, 2021.

* cited by examiner

*Primary Examiner* — Rafael O De Leon Domenech
(74) *Attorney, Agent, or Firm* — Patterson & Sheridan, LLP

(57) ABSTRACT

Certain aspects of the present disclosure provide a power supply circuit. The power supply circuit generally includes: a switched-mode power supply (SMPS) having an inductive element and a first switch coupled to the inductive element; a feedback path coupled between an output of the SMPS and a control input of the first switch; and a current limit circuit comprising a first capacitive element, a charge circuit coupled to the first capacitive element, a first current source, a first resistive element coupled to the first current source, the capacitive element being coupled to a node between the resistive element and the first current source, a sample-and-hold circuit coupled to the first capacitive element, and a clamp circuit coupled between the sample-and-hold circuit and the feedback path.

30 Claims, 7 Drawing Sheets

CURRENT LIMITING FOR A BOOST CONVERTER

CROSS-REFERENCE TO RELATED APPLICATION

This application claims benefit of and priority to U.S. Provisional Application No. 62/966,449, filed Jan. 27, 2020, which is assigned to the assignee hereof and hereby expressly incorporated by reference herein in its entirety as if fully set forth below and for all applicable purposes.

TECHNICAL FIELD

Certain aspects of the present disclosure generally relate to electronic circuits and, more particularly, to a circuit for a power supply circuit.

BACKGROUND

A voltage regulator ideally provides a constant direct current (DC) output voltage regardless of changes in load current or input voltage. Voltage regulators may be classified as either linear regulators or switching regulators. While linear regulators tend to be small and compact, many applications may benefit from the increased efficiency of a switching regulator. A linear regulator may be implemented by a low-dropout (LDO) regulator, for example. A switching regulator may be implemented by a switched-mode power supply (SMPS), such as a buck converter, a boost converter, or a buck-boost converter.

Power management integrated circuits (power management ICs or PMICs) are used for managing the power requirement of a host system and may include and/or control one or more voltage regulators (e.g., boost converters). A PMIC may be used in battery-operated devices, such as mobile phones, tablets, laptops, wearables, etc., to control the flow and direction of electrical power in the devices. The PMIC may perform a variety of functions for the device such as DC-to-DC conversion (e.g., using a voltage regulator as described above), battery charging, power-source selection, voltage scaling, power sequencing, etc. For example, a PMIC may feature a boost converter to boost a voltage level of a DC input voltage.

SUMMARY

Certain aspects of the present disclosure generally relate to a boost converter including a current-mode feedback control circuit.

Certain aspects of the present disclosure provide a power supply circuit. The power supply circuit generally includes: a switched-mode power supply (SMPS) having an inductive element and a first switch coupled to the inductive element; a feedback path coupled between an output of the SMPS and a control input of the first switch; and a current limit circuit comprising a first capacitive element, a charge circuit coupled to the first capacitive element, a first current source, a first resistive element coupled to the first current source, the capacitive element being coupled to a node between the resistive element and the first current source, a sample-and-hold circuit coupled to the first capacitive element, and a clamp circuit coupled between the sample-and-hold circuit and the feedback path.

Certain aspects of the present disclosure provide a method for voltage regulation. The method generally includes: generating, via a SMPS, an output voltage at an output of the SMPS, wherein the SMPS comprises an inductive element and a first switch coupled to the inductive element, a feedback path being coupled between the output of the SMPS and a control input of the first switch; and limiting a current through the inductive element via a current limit circuit. In some aspects, limiting the current comprises: charging a first capacitive element; sourcing a current across a first resistive element, the first capacitive element being coupled to a node between the first resistive element and the first current source; sampling a voltage across the first capacitive element; and limiting a voltage associated with the feedback path based on the sampled voltage.

Certain aspects of the present disclosure provide an apparatus for voltage regulation. The apparatus generally includes: a SMPS configured to generate an output voltage at an output of the SMPS, wherein the SMPS comprises an inductive element and a first switch coupled to the inductive element, a feedback path being coupled between the output of the SMPS and a control input of the first switch; and means for limiting a current through the inductive element via a current limit circuit. In some aspects, means for limiting the current comprises: means for charging a first capacitive element; means for sourcing a current across a first resistive element, the first capacitive element being coupled to a node between the first resistive element and the first current source; means for sampling a voltage across the first capacitive element; and means for limiting a voltage associated with the feedback path based on the sampled voltage.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
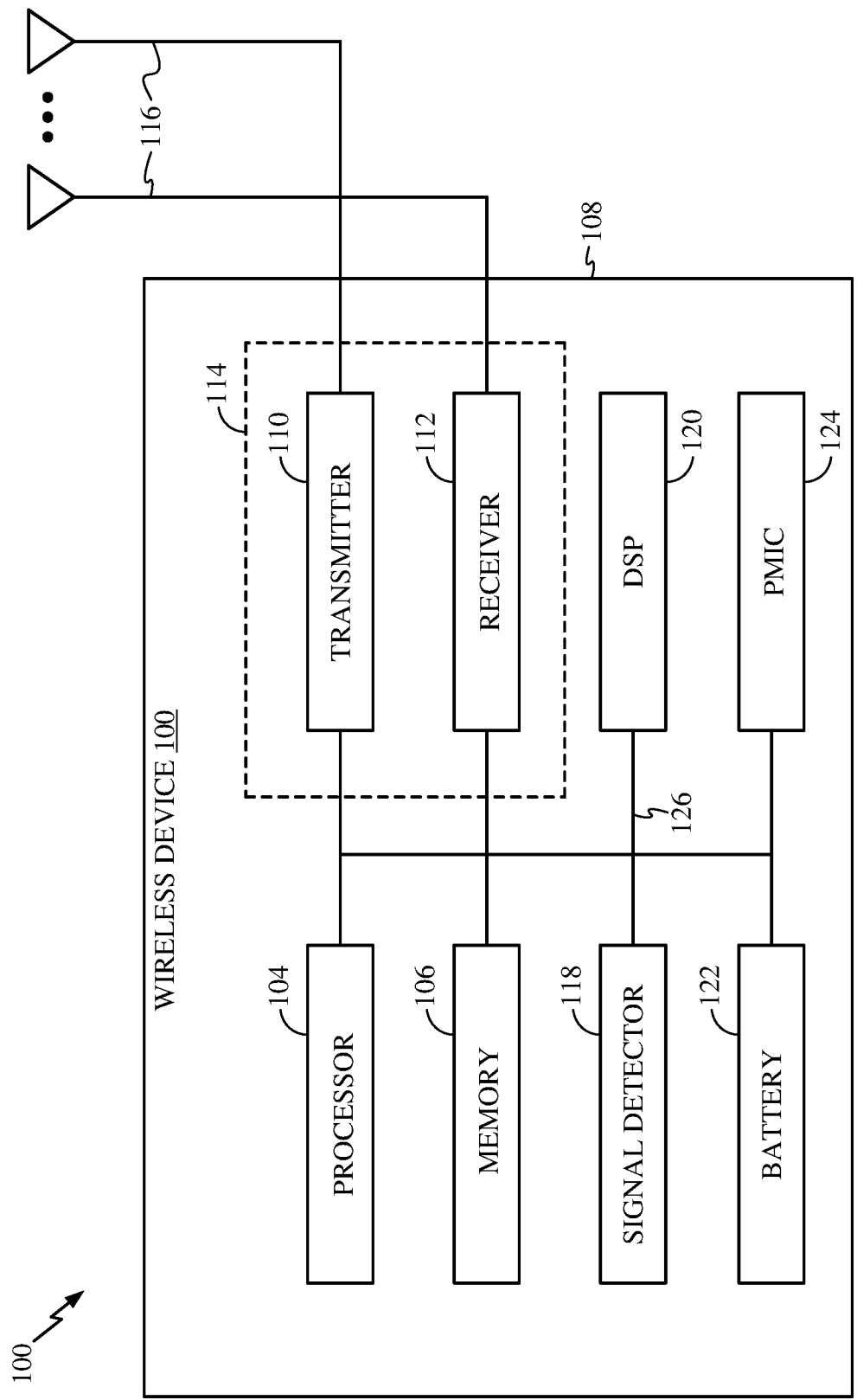
FIG. 1 is a block diagram of an example device including a voltage regulator, according to certain aspects of the present disclosure.

Certain aspects of the present disclosure are directed to apparatus and techniques for limiting an inductor current of a boost converter for a power supply circuit. Certain conventional implementations use a fixed voltage clamp to implement a current limit. However, using a fixed voltage clamp may result in wide variations in the current limit due to variations in the input voltage (Vin) and output voltage (Vout) of the boost converter. Some aspects of the present disclosure are directed to implementations of current limit circuitry in a manner that is independent of Vin and Vout, as described in more detail herein.

In some aspects, the power supply circuit may include a current sense circuit that senses a current through an inductive element of the boost converter. In some aspects of the present disclosure, a configuration of the current sense circuit may be replicated to implement a current limit circuit for limiting the inductor current in a manner that is independent of Vin and Vout. In one aspect, the current limit circuit may clamp an output voltage of an error amplifier in a feedback path of the power supply circuit. In other aspects, the current limit circuit may clamp a supply voltage of the error amplifier in the feedback path of the power supply circuit.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

The techniques described herein may be used in combination with various wireless technologies such as Code Division Multiple Access (CDMA), Orthogonal Frequency Division Multiplexing (OFDM), Time Division Multiple Access (TDMA), Spatial Division Multiple Access (SDMA), Single Carrier Frequency Division Multiple Access (SC-FDMA), Time Division Synchronous Code Division Multiple Access (TD-SCDMA), and so on. Multiple user terminals can concurrently transmit/receive data via different (1) orthogonal code channels for CDMA, (2) time slots for TDMA, or (3) sub-bands for OFDM. A CDMA system may implement IS-2000, IS-95, IS-856, Wideband-CDMA (W-CDMA), or some other standards. An OFDM system may implement Institute of Electrical and Electronics Engineers (IEEE) 802.11, IEEE 802.16, Long Term Evolution (LTE) (e.g., in TDD and/or FDD modes), or some other standards. A TDMA system may implement Global System for Mobile Communications (GSM) or some other standards. These various standards are known in the art.

An Example Device

FIG. 1 illustrates a device 100. The device 100 may be a battery-operated device such as a cellular phone, a personal digital assistant (PDA), a handheld device, a wireless modem, a laptop computer, a tablet, a personal computer, etc. The device 100 is an example of a device that may be configured to implement the various systems and methods described herein.

The device 100 may include a processor 104 which controls operation of the device 100. The processor 104 may also be referred to as a central processing unit (CPU). Memory 106, which may include both read-only memory (ROM) and random access memory (RAM), provides instructions and data to the processor 104. A portion of the memory 106 may also include non-volatile random access memory (NVRAM). The processor 104 typically performs logical and arithmetic operations based on program instructions stored within the memory 106. The instructions in the memory 106 may be executable to implement the methods described herein.

The device 100 may also include a housing 108 that may include a transmitter 110 and a receiver 112 to allow transmission and reception of data between the device 100 and a remote location. The transmitter 110 and receiver 112 may be combined into a transceiver 114. A plurality of antennas 116 may be attached to the housing 108 and electrically coupled to the transceiver 114. The device 100 may also include (not shown) multiple transmitters, multiple receivers, and multiple transceivers.

The device 100 may also include a signal detector 118 that may be used in an effort to detect and quantify the level of signals received by the transceiver 114. The signal detector 118 may detect such signals as total energy, energy per subcarrier per symbol, power spectral density and other signals. The device 100 may also include a digital signal processor (DSP) 120 for use in processing signals.

The device 100 may further include a battery 122 used to power the various components of the device 100. The device 100 may also include a power management integrated circuit (power management IC or PMIC) 124 for managing the power from the battery to the various components of the device 100. The PMIC 124 may perform a variety of functions for the device such as DC-to-DC conversion, battery charging, power-source selection, voltage scaling, power sequencing, etc. In certain aspects, the DC-to-DC converter of the PMIC 124 may include a boost converter as described herein.

The various components of the device 100 may be coupled together by a bus system 126, which may include a power bus, a control signal bus, and a status signal bus in addition to a data bus.

Example Current Limit Boost Converter

Certain aspects of this present disclosure generally relate to a switched-mode power supply (e.g., boost converter) implemented using a current limit circuit, the current limit circuit being configured to limit an inductor current of the boost converter. At peak load currents, using a hard current limit for an inductor of a boost converter may cause inductor current modulation and voltage overshoots. Applying a soft limit for the inductor peak current can help to smooth out the inductor current waveform by allowing the voltage loop to maintain control of the inductor peak current, rather than relying on a hard current limiter. Certain aspects of the present disclosure are generally directed to an implementation of a soft current limiter, as described in more detail herein.

Figure 2:
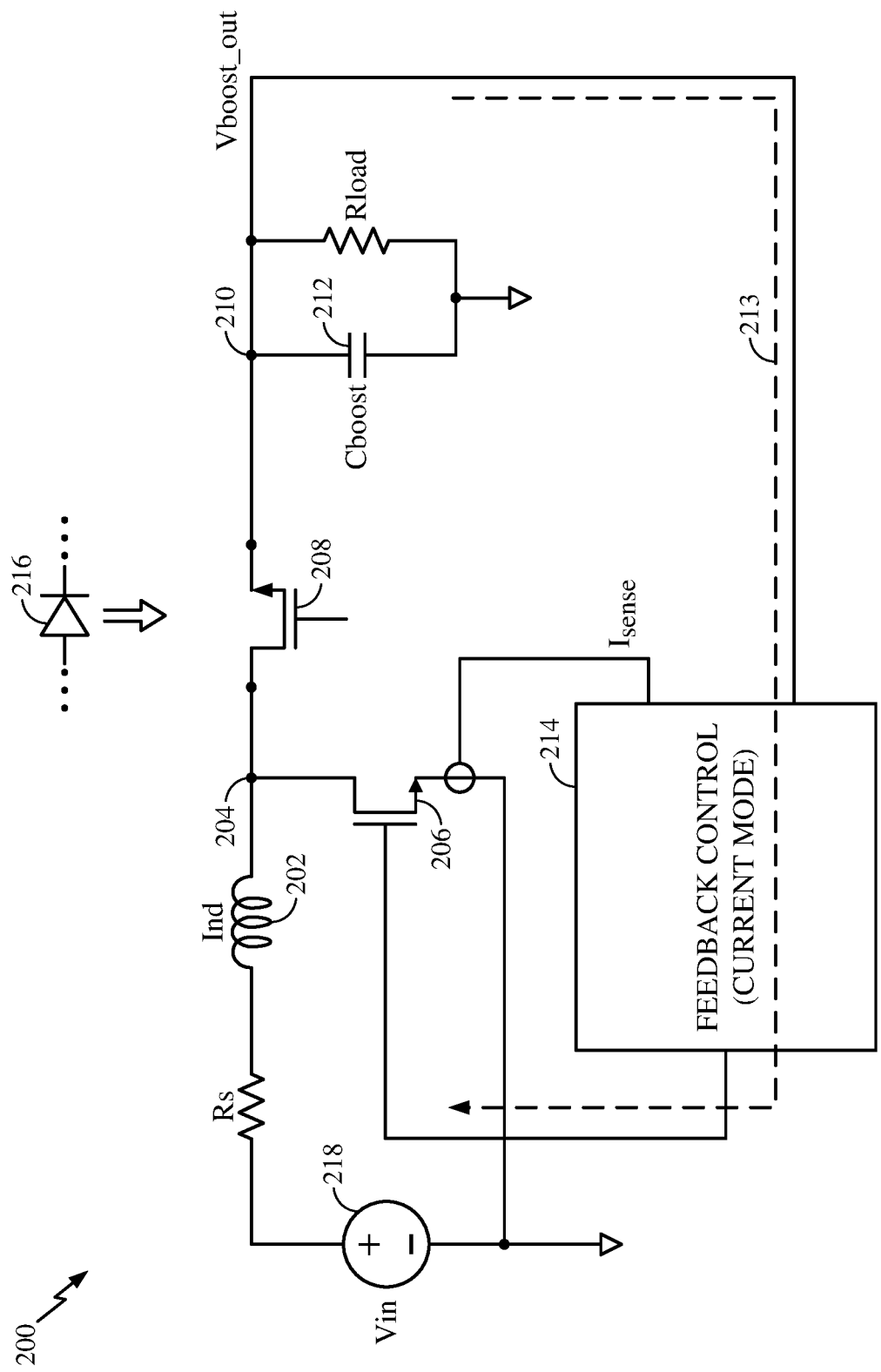
FIG. 2 illustrates an example boost converter, in accordance with certain aspects of the present disclosure.

FIG. 2 illustrates an example power supply circuit 200 having a switched-mode power supply (SMPS) (e.g., a boost converter), in accordance with certain aspects of the present disclosure. The boost converter includes an inductive element 202 (e.g., an inductor) and a switch 206, both coupled to a node 204. The boost converter also includes a switch 208 coupled between the node 204 and an output node 210 of the boost converter. Switch 206 and switch 208 may be implemented by one or more transistors, as illustrated in FIG. 2. The output node 210 may be coupled to an energy storage device (e.g., capacitive element 212) and a load, which is represented in FIG. 2 by a resistive element Rload.

The switch 206 may be controlled by a pulse-width modulation (PWM) signal to open and close the switch 206 in an effort to regulate a boost output voltage (Vboost_out) across the capacitive element 212. For example, during a first period, the switch 206 may be closed, transferring energy from a power supply 218 (represented in FIG. 2 by a voltage source) and storing the energy in the inductive element 202. The switch 206 may be opened during a second period, transferring the energy stored in the inductive element 202 to the capacitive element 212 through the switch 208. In certain aspects, the switch 208 may be replaced with a diode 216, and the energy stored in the inductive element 202 may be transferred to the capacitive element 212 via the diode.

As illustrated, the power supply circuit 200 also includes a current-mode feedback control circuit 214 in a feedback path 213. The feedback control circuit 214 may control the switch 206 and, in some cases, also switch 208 based on both Vboost_out at the output node 210 and a current at a node coupled to switch 206. For example, the feedback control circuit 214 may receive a current sense signal Isense that is representative of the current across switch 206. Isense also represents the current through the inductive element 202 during a period of time when switch 206 is closed. However, in some cases, the feedback control circuit 214 may directly sense the current through the inductive element 202. Based on Isense and Vboost_out, the feedback control circuit 214 controls the current across inductive element 202 by controlling the duty cycle of the PWM signal used to drive switch 206 (and switch 208).

As described herein, at peak load currents, using a hard current limit for an inductor of a boost converter may cause inductor current modulation and voltage overshoots. For instance, for a hard current limiter, a comparison may be made between a sensed inductor current (Isense) and a reference current. Isense may be driven through a resistive element to create a sensed voltage (Vsns). Vsns may be compared with a reference voltage (Vref). When Vsns exceeds Vref, a high-side field-effect transistor (FET) (e.g., switch 208) of the boost converter may be turned off for a corresponding switching cycle. Once the high-side FET is turned off, if Vref is reduced, the voltage loop may be slower to respond, and the peak current may persist in the inductor, causing voltage peaking at the output of the boost converter.

Certain aspects of the present disclosure are generally directed to an implementation of a soft current limiter that provides improved output power capability and inductor current stability for a wide range of boost output voltages as compared to conventional implementations. As described in more detail herein, a voltage (e.g., a supply voltage or output voltage of an error amplifier (EA)) associated with a feedback path of the power supply circuit may be varied in order to limit the peak inductor current, with this variation being proportional to duty cycle and thereby, the inductor current ripple, as described in more detail herein.

Figure 3:
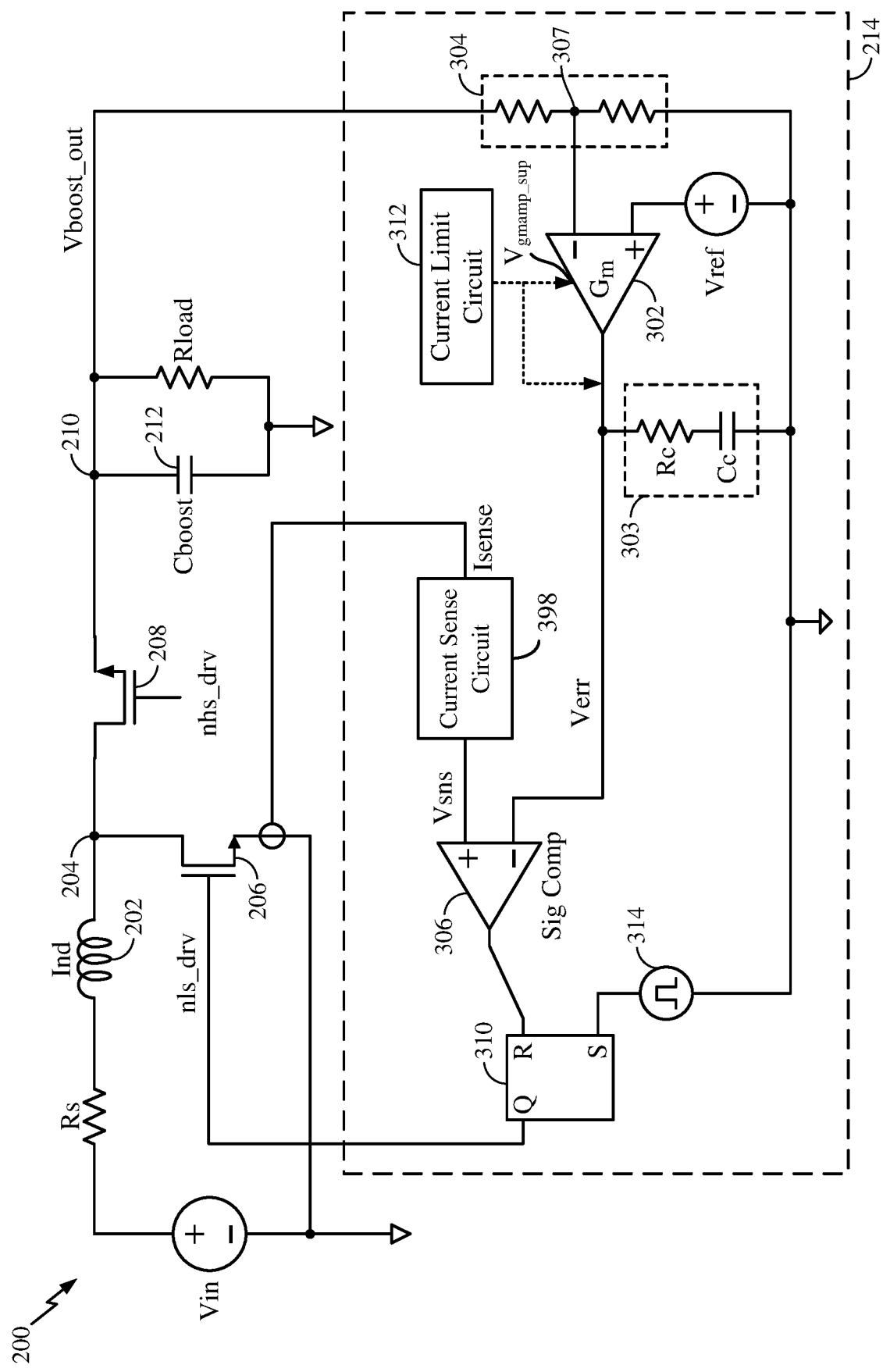
FIG. 3 illustrates an example boost converter and example implementation details of a feedback control circuit, in accordance with certain aspects of the present disclosure.

FIG. 3 illustrates the example power supply circuit 200 and example implementation details of the feedback control circuit 214, in accordance with certain aspects of the present disclosure. As illustrated, the feedback control circuit 214 includes an amplifier 302 (e.g., a transconductance (Gm) amplifier, also referred to herein as an "EA") coupled to a tap 307 of a voltage divider circuit 304. The voltage divider circuit 304 is used to step down the voltage Vboost_out. Thus, the amplifier 302 may compare the voltage at the tap 307 to Vref and generate an output current. The output of the amplifier 302 may be coupled to an impedance 303 to convert the output current of the amplifier 302 to a voltage. In certain aspects, the impedance 303 may be implemented using a resistive element Rc connected in series with a capacitive element Cc.

The feedback control circuit 214 may also include a comparator 306 configured to receive a signal representative of Isense for comparison to the voltage at the output of amplifier 302. For example, the current Isense may be converted to a current sense voltage (Vsns) via a current sensing circuit 398. In certain aspects, a compensation ramp signal may be added to the current sense voltage for slope compensation and to stabilize the current loop feedback, as will be described in more detail with respect to FIG. 4.

In certain aspects, the feedback control circuit 214 also includes a flip-flop 310 (e.g., a set-reset (SR) flip-flop) for controlling the switch 206 via an nls_drv signal. For example, the set (S) input of the flip-flop 310 may be coupled to a pulse generator circuit 314, and the reset (R) input of the flip-flop 310 may be coupled to the output of the comparator 306. The pulse generator circuit 314 may generate a pulse signal for driving the S input of the flip-flop 310. The pulse signal may have a periodic waveform with about a 1-2% duty cycle. The flip-flop 310 may generate a PWM output signal, the duty cycle of which is controlled based on Isense and Vboost_out.

Figure 4:
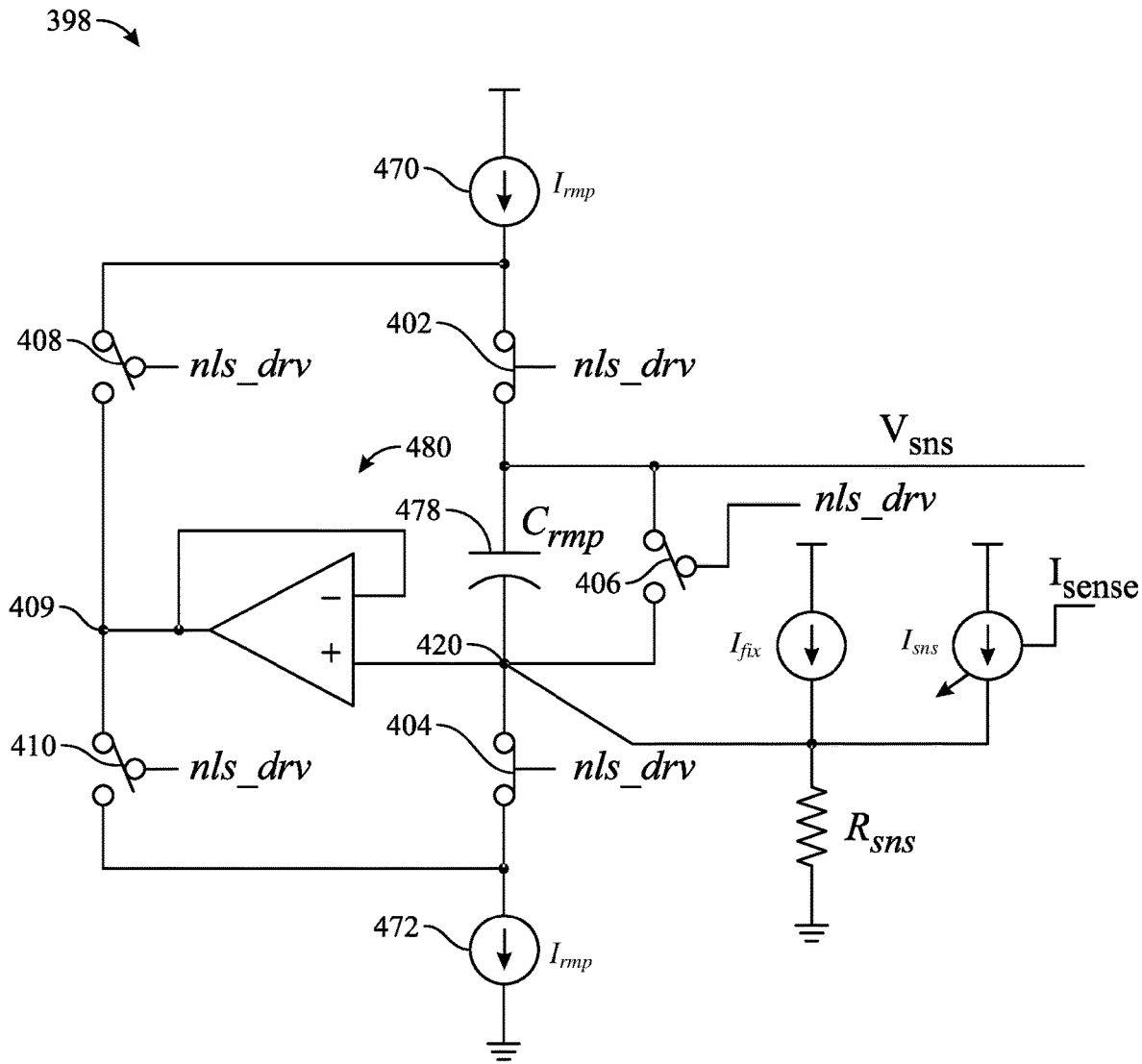
FIG. 4 illustrates example implementations of a current sense circuit, in accordance with certain aspects of the present disclosure.

FIG. 4 illustrates example implementations of the current sense circuit 398, in accordance with certain aspects of the present disclosure. As illustrated, Isense may be used to set the current of an adjustable current source (Isns) coupled to a sense resistor (Rsns). The current provided by current source Isns may be proportional to the current through either the switch 206 or the inductive element 202. In some cases, a fixed current source ($I_{fix}$) may also be coupled to Rsns to set a nominal voltage (e.g., bias voltage) at node 420, as illustrated. Rsns may be coupled to a capacitive element 478

(also referred to herein as "$C_{rmp}$") at node 420, $C_{rmp}$ being used to generate a ramp voltage sense signal (e.g., Vsns) that is provided to a comparator (e.g., comparator 306 of FIG. 3). The current flow across Rsns via the current sources $I_{fix}$ and Inns may generate a voltage at node 420.

Current sources $I_{rmp}$ 470, 472 may be selectively coupled to $C_{rmp}$ via switches 402, 404, respectively. When the nls_drv signal is logic high, the switches 402, 404 are closed, charging $C_{rmp}$, and when nls_drv is logic low, switch 406 is closed, discharging $C_{rmp}$. Moreover, switches 408, 410 may also be closed when nls_drv is logic low to provide a current flow path for $I_{rmp}$. Thus, Vsns may be a ramp signal, the peak of which is proportional to the nls_drv signal and Isense. In certain aspects, a buffer 480 may be coupled between node 420 and a node 409 between switches 408, 410.

Certain aspects of the present disclosure provide techniques for setting a current limit for the power supply circuit 200. For example, referring back to FIG. 3, a current limit circuit 312 may be used to set and/or adjust a voltage supply (referred to herein as "$V_{gmamp\_sup}$") of the amplifier 302 based on a desired limit (e.g., a maximum) of current flow through the inductive element 202. The output current and voltage of the amplifier 302 may be limited by setting $V_{gmamp\_sup}$ to a particular voltage. Thus, by setting $V_{gmamp\_sup}$, the inductor current of the boost converter may be limited by limiting the duty cycle of the PWM signal used to drive switch 206. In some implementations, the current limit circuit 312 may be configured to clamp an output voltage (referred to herein as "$V_{gmamp\_max}$") of the amplifier 302 (e.g., instead of setting $V_{gmamp\_sup}$), as described in more detail herein.

The current limit circuit 312 may limit the peak current of the inductive element 202 to a predetermined value, ILmax, that does not result in saturation of the inductive element. As described herein, Vsns represents the sensed inductor current. However, Vsns is implemented as a ramp voltage that is proportional to the duty cycle of the boost converter (e.g., generated via Tramp and switches 402, 404, as described with respect to FIG. 4). This duty cycle is a proportional signal that varies according to an input voltage (Vin) of the boost converter and an output voltage (Vboost_out) of the boost converter.

For a class-H boost converter, with wide variations in Vin and Vout, the current limit can vary widely if a fixed voltage clamp is used. By contrast, when tracking the duty cycle of the boost converter to set the current limit, the current limit may be set independently of variations of Vin and Vout. In certain aspects, the current limit circuit 312 may limit the inductor current in a manner that tracks the duty cycle of the boost converter and is independent of Vin and Vout.

In some aspects, the current sensing circuit 398 may generate Vsns which may be equal to the error voltage (Verr) at the output of the amplifier 302 and proportional to $(I_{sns}+I_{fix})*R_{sns}+V_{ramp}$, $V_{ramp}$ being the voltage across $C_{rmp}$. The current limit circuit 312 may be implemented as a replica of the current sensing circuit 398, but with the tunable current source Inns being replaced with a fixed current source $I_{max}$. Thus, the current limit circuit 312 may generate a clamp voltage (Vclamp) used to clamp Verr at the output of the amplifier 302 for current limiting the inductor current, the clamp voltage being proportional to $(I_{max}+I_{fix})*R_{sns}+V_{ramp}$. Therefore, with both Vsns (e.g., equal to Verr) and Vclamp tracking the duty cycle of the boost converter (e.g., due to the $V_{ramp}$ parameter), the inductor current limit may be implemented in a manner that is independent of Vin and Vout.

Figure 5:
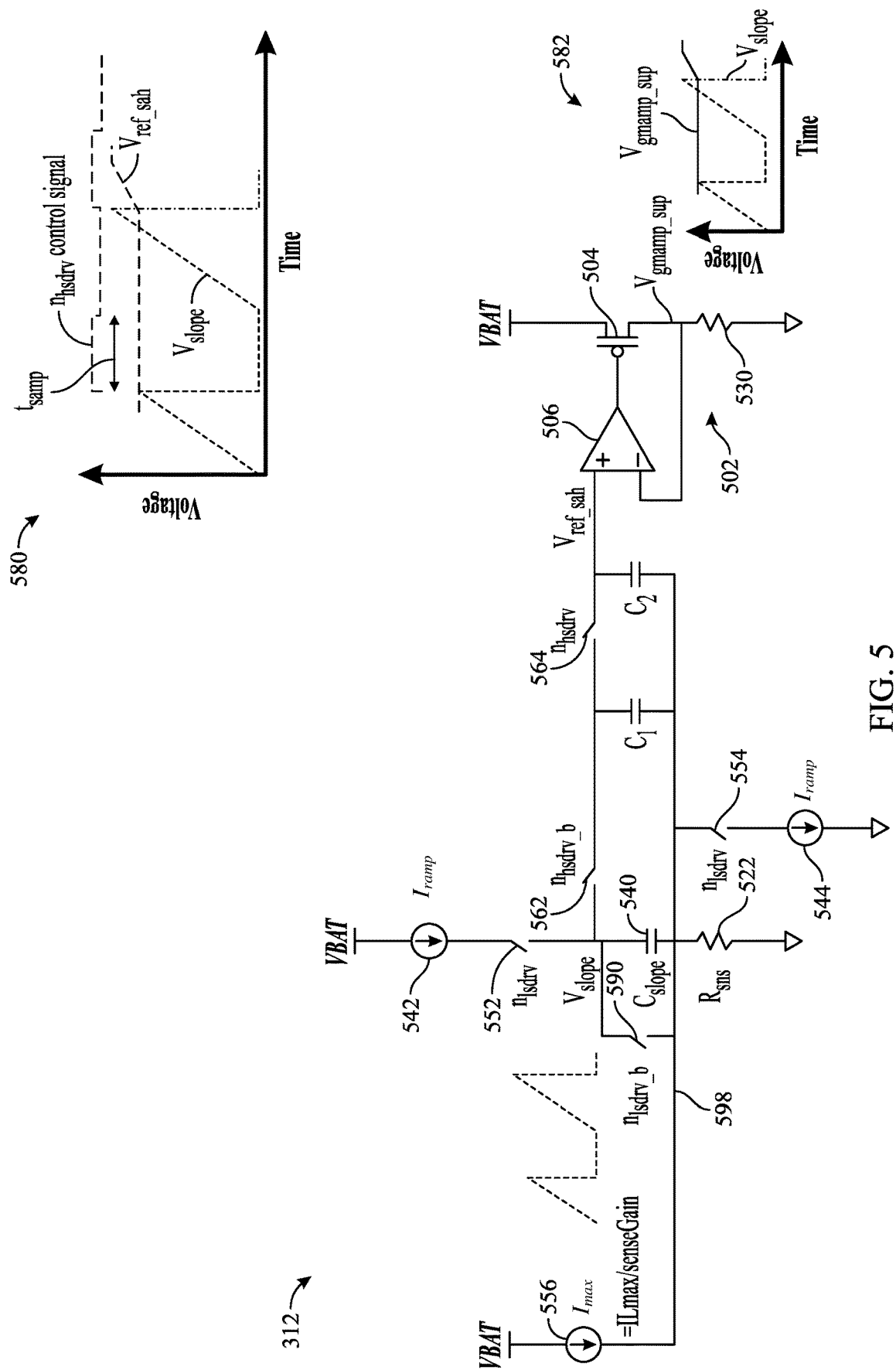
FIG. 5 illustrates an example implementation of a current limit circuit configured to clamp a supply voltage of an amplifier, in accordance with certain aspects of the present disclosure.

FIG. 5 illustrates an example implementation of the current limit circuit 312, in accordance with certain aspects of the present disclosure. The current limit circuit 312 may be configured to clamp a supply voltage of the amplifier 302 in a feedback path of the power supply circuit 200. As described herein, the current sense circuit 398 may be used to sense the current at the source of the switch 206 (e.g., when implemented as a transistor) and generate a sense voltage $V_{sns}$ at a positive input terminal of the comparator 306. In certain aspects of the present disclosure, a replica of the current sense circuit 398 may be used to implement the current limit circuit 312, as described. As illustrated, the current limit circuit 312 includes a capacitive element 540 (e.g., having a capacitance $C_{slope}$) (e.g., replica of $C_{rmp}$ of current sense circuit 398) and current sources 542, 544 providing currents $I_{ramp}$. The current sources 542, 544 may be replicas of current sources 470, 472 of current sense circuit 398. The current sources 542, 544 and switches 552, 554 may form a charging circuit. The switches 552, 554 may be controlled via the signal $n_{lsdrv}$ used to control the switch 206 as described with respect to FIG. 3. In other words, capacitive element 540 may be charged when switches 552, 554 are closed, the switches 552, 554 being closed when the switch 206 of FIG. 2 is closed. In some aspects, a switch 590 may be coupled in parallel with the capacitive element 540 to selectively discharge the capacitive element 540 when closed. The switch 590 may be controlled via a $n_{lsdrv\_b}$ signal (e.g., complementary to the signal $n_{lsdrv}$).

The current limit circuit 312 of FIG. 5 also includes a current source 556 supplying a current $I_{max}$ configured to set the current limit for the current limit circuit 312. For example, $I_{max}$ may be set in accordance with the following equation:

$$Imax = \frac{ILmax}{SenseGain}$$

where ILmax is a chosen maximum current through the inductive element 202 and SenseGain is the gain associated with sensing the current through the inductive element 202 (e.g., gain associated with generating Isense).

The current $I_{max}$ may flow across a sense resistive element 522 (Rsns) to set a voltage at node 598. The resistive element 522 may be a replica of the sense resistive element (Rsns) of the current sense circuit 398. Thus, the switches 552, 554 and current sources 542, 544 set a slope voltage $V_{slope}$ having a peak that is proportional to both the duty cycle of the boost converter (e.g., duty cycle of nls_drv) and $I_{max}$.

The capacitive elements $C_1$ and $C_2$ and switches 562, 564 (e.g., controlled by signals $n_{hsdrv\_b}$ and $n_{hsdrv}$, respectively) implement a sample-and-hold circuit. For example, the switch 562 may be closed (e.g., when the switch 208 is open) to sample the voltage across the capacitive element 540 onto the capacitive element $C_1$. Subsequently, switch 564 may be closed, and the switch 562 may be opened, transferring charge from the capacitive element $C_1$ to capacitive element $C_2$ to generate a sample-and-hold reference voltage ($V_{ref\_sah}$). For example, as illustrated by diagram 580, if the peak voltage of $V_{slope}$ increases from one charge cycle to the next, the new peak voltage is sampled, and $V_{ref\_sah}$ increases to the new peak voltage. As illustrated, $V_{ref\_sah}$ may be provided to a positive input terminal of an amplifier 506. In certain aspects, the sample time ($t_{samp}$) for the sample-and-hold circuit may be set to be sufficient for transferring the entire charge from $C_1$ to $C_2$ but much smaller than the maximum duty cycle off-time of the boost converter.

As illustrated, the current limit circuit 312 of FIG. 5 may be implemented with an active clamp circuit 502 having the amplifier 506 and a p-type metal-oxide-semiconductor (PMOS) transistor 504. The active clamp circuit 502 is configured to clamp a supply voltage ($V_{gmamp\_sup}$) at a supply node of amplifier 302 to limit the inductor current of the boost converter. For example, an output of the amplifier 506 may be coupled to a gate of the PMOS transistor 504 to implement a regulator that sets $V_{gmamp\_sup}$. That is, a source of the PMOS transistor 504 may be coupled to a voltage rail (e.g., battery voltage VBAT), and a drain of the PMOS transistor 504 may be coupled to the negative input terminal of the amplifier 506 and a resistive element 530. As illustrated, the resistive element 530 is coupled between the transistor 504 and electric ground (e.g., a reference potential node). As illustrated by diagram 582, if the peak voltage of $V_{slope}$ increases from one charge cycle to the next, $V_{gmamp\_sup}$ increases to the new peak voltage.

Figure 6:
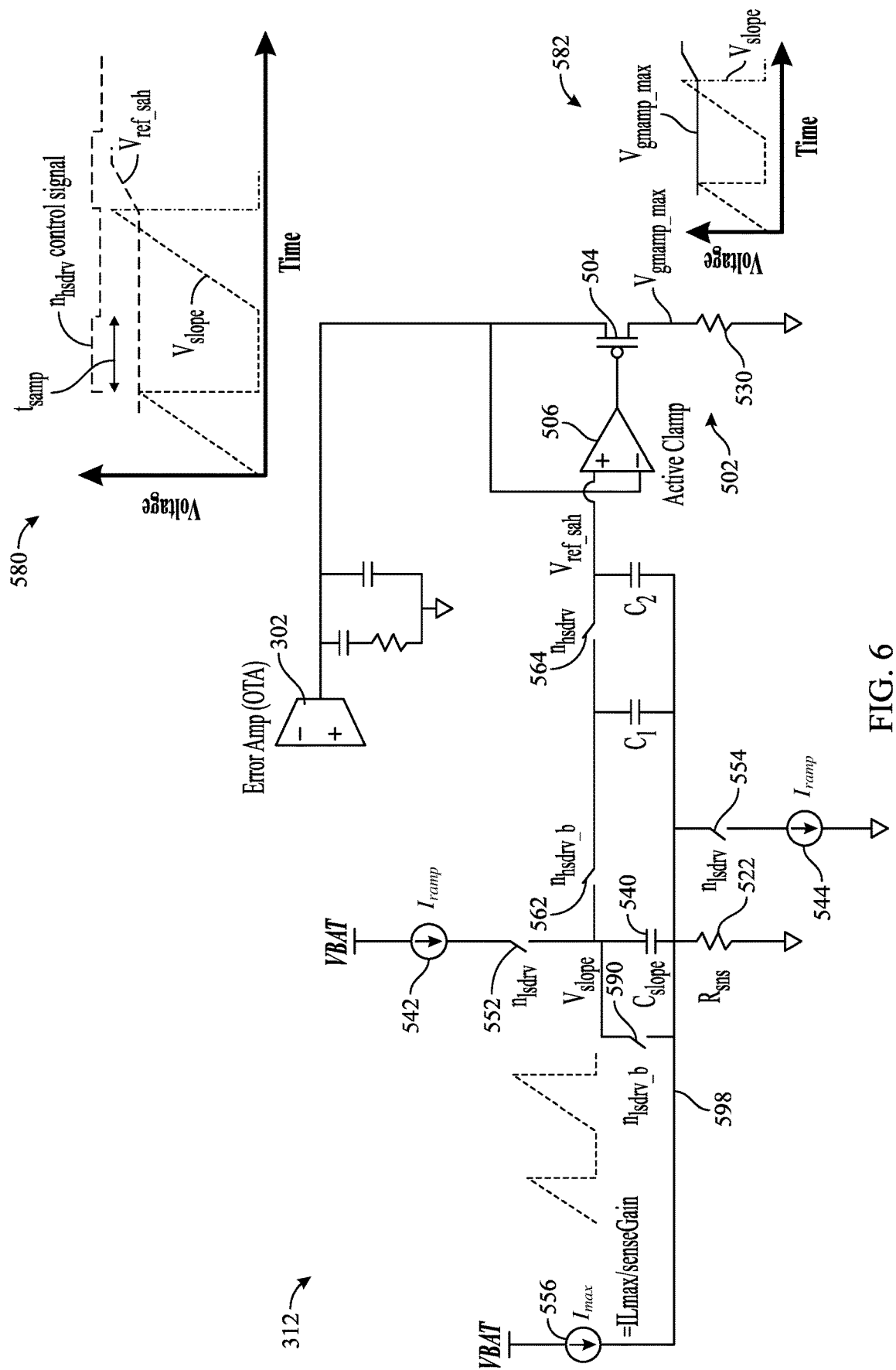
FIG. 6 illustrates an example implementation of a current limit circuit configured to clamp a voltage at an output of an amplifier, in accordance with certain aspects of the present disclosure.

FIG. 6 illustrates an example implementation of the current limit circuit 312 configured to clamp a voltage at an output of the amplifier 302, in accordance with certain aspects of the present disclosure. As illustrated, the negative input terminal of the amplifier 506 may be coupled to the output of the amplifier 302, the output of the amplifier 506 being coupled to a gate of the PMOS transistor 504. Therefore, as long as the voltage at the output of the amplifier 302 is below $V_{ref\_sah}$, the PMOS transistor 504 is turned off. However, if the voltage (Verr) at the output of the amplifier 302 goes above $V_{ref\_sah}$, the PMOS transistor 504 will begin to turn on, pulling down the voltage at the output of the amplifier 302, effectively limiting the inductor current of the boost converter. As illustrated by diagram 682, if the peak voltage of $V_{slope}$ increases from one charge cycle to the next, $V_{gmamp\_max}$ increases to the new peak voltage.

As described herein, the current limit circuit 312 replicates a configuration of the current sensing circuit 398, but instead of receiving a sense current, receives a reference current, denoted by $I_{max}$. The current limit circuit 312 may set $V_{ref\_sah}$ to be equal to IL_max/SenseGain+$I_{ramp}$/$C_{slope}$*t_on, where t_on is the on-time of the switch 206. Thus, the error amplifier clamp level (e.g., set based on $V_{ref\_sah}$) may be independent of t_on (e.g., the duty cycle of the boost converter) since both Vsns (e.g., generated via the current sense path having the current sense circuit 398) and $V_{ref\_sah}$ (e.g., generated via the current limit path having the current limit circuit 312) are dependent on t_on, resulting in the effect of t_on on the error amplifier clamp level being cancelled out (or at least reduced). In other words, the error amplifier clamp level may only depend on the chosen IL_max parameter.

Example Power Supply Circuit

Certain aspects of the present disclosure are directed to a power supply circuit (e.g., power supply circuit 200). The power supply circuit generally includes a switched-mode power supply (SMPS) (e.g., a boost converter) having an inductive element (e.g., inductive element 202) and a first switch (e.g., switch 206) coupled to the inductive element. The power supply circuit may also include a feedback path (e.g., feedback path 213) coupled between an output of the SMPS and a control input of the first switch. In some aspects, the power supply circuit may include a current limit circuit (e.g., current limit circuit 312) having a first capacitive element (e.g., Cslope), a charge circuit (e.g., current sources 542, 544 and switches 552, 554) coupled to the first capacitive element. In some aspects, the charging circuit may be configured to charge the first capacitive element when the first switch is closed. The current limit circuit may also include a first current source (e.g., current source 556), a first resistive element (e.g., resistive element 522) coupled to the first current source, the first capacitive element being coupled to a node (e.g., node 598) between the first resistive element and the first current source. In some aspects, the first current source may be configured to set a limit for current flow through the inductive element. The current limit circuit may also include a sample-and-hold circuit coupled to the first capacitive element, and a clamp circuit (e.g., clamp circuit 502) coupled between the sample-and-hold circuit and the feedback path.

In certain aspects, the power supply circuit may also include a current sensing circuit (e.g., current sense circuit 398) configured to source a sense current (e.g., Isns of FIG. 4) across a second resistive element (e.g., Rsns of FIG. 4), the sense current being indicative of a current through the inductive element. The first resistive element may be a replica of the second resistive element.

In some aspects, the sample-and-hold circuit may include a second capacitive element (e.g., capacitive element $C_1$ of FIGS. 5-6), a second switch (e.g., switch 562) coupled between the first capacitive element and the second capacitive element, a third capacitive element (e.g., capacitive element $C_2$ of FIGS. 5-6) coupled to the amplifier, and a third switch (e.g., switch 564) coupled between the second capacitive element and the third capacitive element. In some aspects, the second capacitive element is coupled in parallel with the first capacitive element when the second switch is closed.

In certain aspects, the clamp circuit may include an amplifier; and a transistor (e.g., transistor 504) having a gate coupled to the output of the amplifier, a drain of the transistor being coupled to the feedback path. In some aspects, the feedback path may include an error amplifier (e.g., amplifier 302) coupled between the output of the SMPS and the control input of the first switch, and a source of the transistor may be coupled to an output of the error amplifier. In this case, a positive input terminal of the amplifier may be coupled to the sample-and-hold circuit, and a negative input terminal of the amplifier may be coupled to the source of the transistor.

In some aspects, the feedback path may include an error amplifier coupled between the output of the SMPS and the control input of the first switch, and the drain of the transistor may be coupled to a supply node of the error amplifier. In this case, a positive input terminal of the amplifier may be coupled to the sample-and-hold circuit, and a negative input terminal of the amplifier may be coupled to the drain of the transistor.

In some aspects, the clamp circuit may be configured to set a voltage associated with the feedback path based on a voltage at an output of the sample-and-hold circuit. For example, as described with respect to FIG. 6, the feedback path may include an error amplifier coupled between the output of the SMPS and the control input of the first switch, and the voltage associated with the feedback path may include an output voltage of the error amplifier. In some aspects, as described with respect to FIG. 5, the feedback path may include an error amplifier coupled between the output of the SMPS and the control input of the first switch, and the voltage associated with the feedback path may include a supply voltage of the error amplifier.

In some aspects, the charging circuit may include a second current source (e.g., current source 542), and a second switch (e.g., switch 552) coupled between the second current source and the first capacitive element. The second switch may be configured to be closed when the first switch (e.g., switch 206) is closed. The current limit circuit may also include a third switch (e.g., switch 590) coupled in parallel with the first capacitive element, wherein the second switch is configured to be open when the third switch is closed.

In some aspects, the power supply circuit may include a current sensing circuit (e.g., current sense circuit 398) configured to sense a current across the inductive element. The current limit circuit may replicate a configuration of one or more components of the current sensing circuit.

Example Techniques for Voltage Regulation

Figure 7:
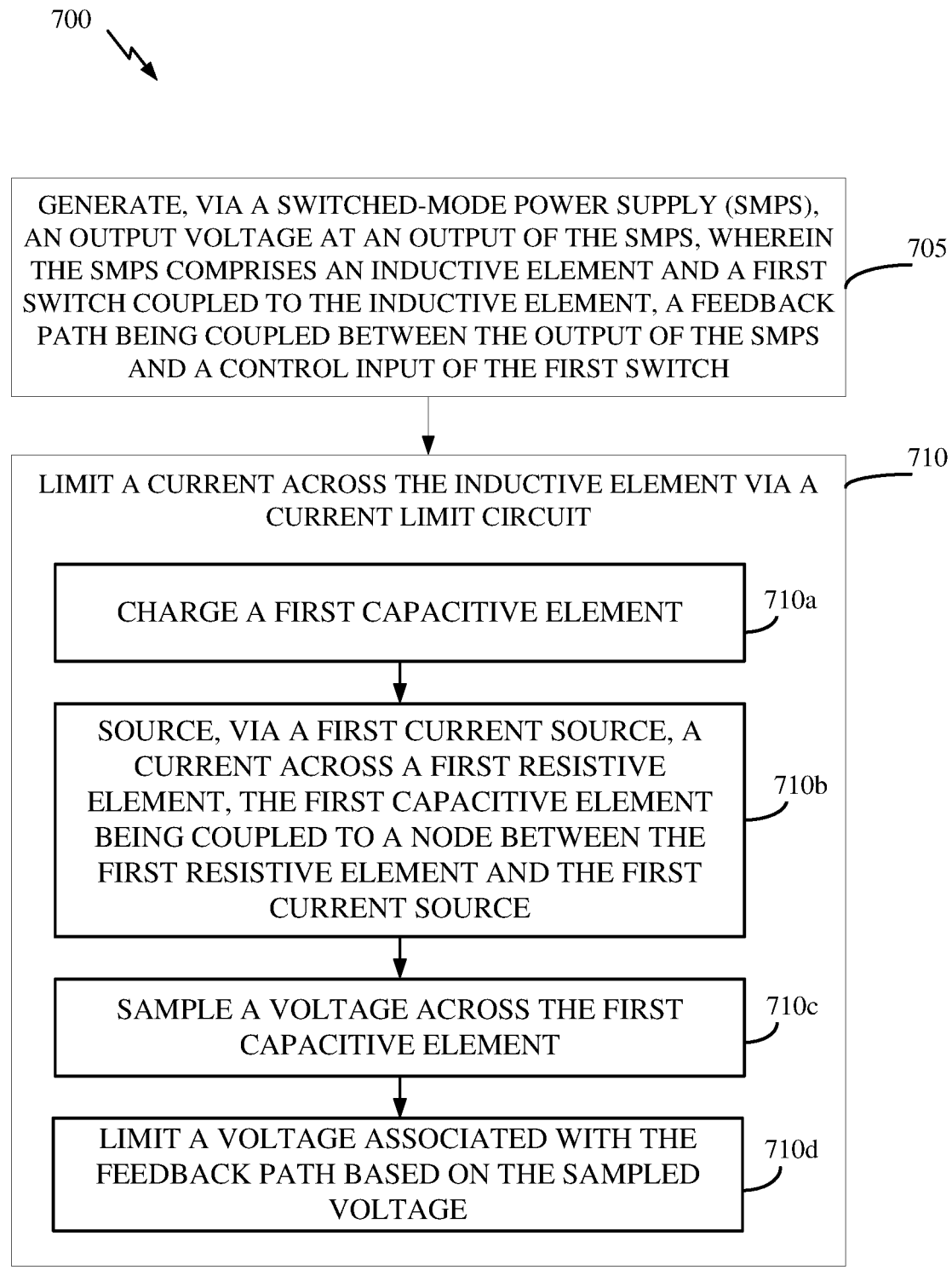
FIG. 7 is a flow diagram illustrating example operations for voltage regulation, in accordance with certain aspects of the present disclosure.

FIG. 7 is a flow diagram illustrating example operations 700 for voltage regulation, in accordance with certain aspects of the present disclosure. The operations 700 may be performed, for example, by the power supply circuit 200.

The operations 700 begin, at block 705, with the power supply circuit 200 generating, via a switched-mode power supply (SMPS), an output voltage at an output of the SMPS. The SMPS may include an inductive element (e.g., inductive element 202) and a first switch (e.g., switch 206) coupled to the inductive element, a feedback path being coupled between the output of the SMPS and a control input of the first switch. At block 710, the power supply circuit 200 may limit a current across the inductive element via a current limit circuit (e.g., current limit circuit 312). For example, limiting the current may include, at block 710a, charging a first capacitive element (e.g., capacitive element 540), at block 710b, sourcing a current (e.g., $I_{max}$ described with respect to FIGS. 5-6) across a first resistive element (e.g., resistive element 522), the first capacitive element being coupled to a node (e.g., node 598) between the first resistive element and the first current source. Limiting the current may also include, at block 710c, sampling a voltage across the first capacitive element, and at block 710d, limiting a voltage associated with the feedback path based on the sampled voltage.

In some aspects, the charging of the first capacitive element may include charging the first capacitive element when the first switch is closed. The operations 700 may also include discharging (e.g., via switch 590) the first capacitive element when the first switch is turned off.

In some aspects, the operations 700 may also include sourcing a sense current (e.g., $I_{sns}$ described with respect to FIG. 4) across a second resistive element (e.g., resistive element $R_{sns}$ described with respect to FIG. 4), the sense current being indicative of a current across the inductive element. In some aspects, the first resistive element may be a replica of the second resistive element. In some aspects, limiting the current across the inductive element may also include setting the current (e.g., $I_{max}$ described with respect to FIGS. 5-6) to be sourced across the first resistive element to limit the current across the inductive element.

In some aspects, the sampling of the voltage across the first capacitive element may include charging a second capacitive element (e.g., capacitive element $C_1$ described with respect to FIGS. 5-6) based on the voltage across the first capacitive element, and after the charging of the second capacitive element, transferring a charge across the second capacitive element to a third capacitive element (e.g., capacitive element $C_2$ described with respect to FIGS. 5-6), the sampled voltage being the voltage across the third capacitive element after the transferring of the charge.

In some aspects, the feedback path may include an error amplifier (e.g., amplifier 302) coupled between the output of the SMPS and the control input of the first switch. In this case, limiting the voltage associated with the feedback path may include limiting a supply voltage of the error amplifier. In some aspects, limiting the voltage associated with the feedback path may include limiting an output voltage of the error amplifier.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering.

For example, means for limiting a current may comprise a current limit circuit, such as the current limit circuit 312. Means for charging and means for sourcing may comprise a current source, such as the current source 542, current source 544, or current source 556. Means for sampling may comprise a capacitive element, such as the capacitive elements $C_1$, $C_2$ of FIGS. 5 and 6, and switches, such as switches 562, 564. In some aspects, means for limiting a voltage may comprise an amplifier such as the amplifier 506, or transistor such as the transistor 504. In some aspects, means for charging a capacitive element may include a switch such as the switch 562. In some aspects, means for transferring a charge may include a switch such as the switch 564.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC with the processor, the bus interface, the user interface in the case of an access terminal), supporting circuitry, and at least a portion of the machine-readable media integrated into a single chip, or with one or more FPGAs, PLDs, controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

Example Aspects

Aspect 1. A power supply circuit comprising: a switched-mode power supply (SMPS) having an inductive element and a first switch coupled to the inductive element; a feedback path coupled between an output of the SMPS and a control input of the first switch; and a current limit circuit comprising: a first capacitive element; a charge circuit coupled to the first capacitive element; a first current source; a first resistive element coupled to the first current source, the first capacitive element being coupled to a node between the first resistive element and the first current source; a sample-and-hold circuit coupled to the first capacitive element; and a clamp circuit coupled between the sample-and-hold circuit and the feedback path.

Aspect 2. The power supply circuit of aspect 1, wherein the charging circuit is configured to charge the first capacitive element when the first switch is closed.

Aspect 3. The power supply circuit of one of aspects 1-2, further comprising a current sensing circuit configured to source a sense current across a second resistive element, the sense current being indicative of a current through the inductive element, wherein the first resistive element is a replica of the second resistive element.

Aspect 4. The power supply circuit of one of aspects 1-3, wherein the first current source is configured to set a limit for current flow through the inductive element.

Aspect 5. The power supply circuit of one of aspects 1-4, wherein the sample-and-hold circuit comprises: a second capacitive element; a second switch coupled between the first capacitive element and the second capacitive element; a third capacitive element coupled to the clamp circuit; and a third switch coupled between the second capacitive element and the third capacitive element.

Aspect 6. The power supply circuit of aspect 5, wherein the second capacitive element is coupled in parallel with the first capacitive element when the second switch is closed.

Aspect 7. The power supply circuit of one of aspects 1-6, wherein the clamp circuit comprises: an amplifier; and a transistor having a gate coupled to the output of the amplifier, a drain of the transistor being coupled to the feedback path.

Aspect 8. The power supply circuit of aspect 7, wherein the feedback path comprises an error amplifier coupled between the output of the SMPS and the control input of the first switch, and wherein a source of the transistor is coupled to an output of the error amplifier.

Aspect 9. The power supply circuit of aspect 8, wherein a positive input terminal of the amplifier is coupled to the sample-and-hold circuit, and wherein a negative input terminal of the amplifier is coupled to the source of the transistor.

Aspect 10. The power supply circuit of one of aspects 7-9, wherein the feedback path comprises an error amplifier coupled between the output of the SMPS and the control input of the first switch, and wherein the drain of the transistor is coupled to a supply node of the error amplifier.

Aspect 11. The power supply circuit of aspect 10, wherein a positive input terminal of the amplifier is coupled to the sample-and-hold circuit, and wherein a negative input terminal of the amplifier is coupled to the drain of the transistor.

Aspect 12. The power supply circuit of one of aspects 1-11, wherein the clamp circuit is configured to set a voltage associated with the feedback path based on a voltage at an output of the sample-and-hold circuit.

Aspect 13. The power supply circuit of aspect 12, wherein the feedback path comprises an error amplifier coupled between the output of the SMPS and the control input of the first switch, and wherein the voltage associated with the feedback path comprises an output voltage of the error amplifier.

Aspect 14. The power supply circuit of one of aspects 12-13, wherein the feedback path comprises an error amplifier coupled between the output of the SMPS and the control input of the first switch, and wherein the voltage associated with the feedback path comprises a supply voltage of the error amplifier.

Aspect 15. The power supply circuit of one of aspects 1-14, wherein the charging circuit comprises: a second current source; and a second switch coupled between the second current source and the first capacitive element.

Aspect 16. The power supply circuit of aspect 15, wherein the second switch is configured to be closed when the first switch is closed.

Aspect 17. The power supply circuit of one of aspects 15-16, wherein the current limit circuit further comprises a third switch coupled in parallel with the first capacitive element, and wherein the second switch is configured to be open when the third switch is closed.

Aspect 18. The power supply circuit of one of aspects 1-17, further comprising a current sensing circuit configured to sense a current through the inductive element, wherein the current limit circuit replicates a configuration of one or more components of the current sensing circuit.

Aspect 19. A method for voltage regulation, comprising: generating, via a switched-mode power supply (SMPS), an output voltage at an output of the SMPS, wherein the SMPS comprises an inductive element and a first switch coupled to the inductive element, a feedback path being coupled between the output of the SMPS and a control input of the first switch; and limiting a current through the inductive element via a current limit circuit, wherein limiting the current comprises: charging a first capacitive element; sourcing, via a first current source, a current across a first resistive element, the first capacitive element being coupled to a node between the first resistive element and the first current source; sampling a voltage across the first capacitive element; and limiting a voltage associated with the feedback path based on the sampled voltage.

Aspect 20. The method of aspect 19, wherein the charging of the first capacitive element comprises charging the first capacitive element when the first switch is closed.

Aspect 21. The method of aspect 20, further comprising discharging the first capacitive element when the first switch is open.

Aspect 22. The method of one of aspects 19-21, further comprising sourcing a sense current across a second resistive element, the sense current being indicative of a current through the inductive element, wherein the first resistive element is a replica of the second resistive element.

Aspect 23. The method of one of aspects 19-22, wherein limiting the current through the inductive element further comprises setting the current to be sourced across the first resistive element to limit the current through the inductive element.

Aspect 24. The method of one of aspects 19-23, wherein the sampling of the voltage across the first capacitive element comprises: charging a second capacitive element based on the voltage across the first capacitive element; and after the charging of the second capacitive element, transferring a charge across the second capacitive element to a third capacitive element, the sampled voltage being the voltage across the third capacitive element after the transferring of the charge.

Aspect 25. The method of one of aspects 19-24, wherein the feedback path comprises an error amplifier coupled between the output of the SMPS and the control input of the first switch, and wherein limiting the voltage associated with the feedback path comprises limiting a supply voltage of the error amplifier.

Aspect 26. The method of one of aspects 19-25, wherein the feedback path comprises an error amplifier coupled between the output of the SMPS and the control input of the first switch, and wherein limiting the voltage associated with the feedback path comprises limiting an output voltage of the error amplifier.

Aspect 27. An apparatus for voltage regulation, comprising: a switched-mode power supply (SMPS) configured to generate an output voltage at an output of the SMPS, wherein the SMPS comprises an inductive element and a first switch coupled to the inductive element, a feedback path being coupled between the output of the SMPS and a control input of the first switch; and means for limiting a current through the inductive element, wherein the means for limiting the current comprises: means for charging a first capacitive element; means for sourcing a current across a first resistive element, the first capacitive element being coupled to a node between the first resistive element and the means for sourcing; means for sampling a voltage across the first capacitive element; and means for limiting a voltage associated with the feedback path based on the sampled voltage.

Aspect 28. The apparatus of aspect 27, wherein the means for charging the first capacitive element comprises means for charging the first capacitive element when the first switch is closed.

Aspect 29. The apparatus of one of aspects 27-28, further comprising means for sourcing a sense current across a second resistive element, the sense current being indicative of a current through the inductive element, wherein the first resistive element is a replica of the second resistive element.

Aspect 30. The apparatus of one of aspects 27-29, wherein the means for sampling the voltage across the first capacitive element comprises: means for charging a second capacitive element based on the voltage across the first capacitive element; and means for transferring, after the charging of the second capacitive element, a charge across the second capacitive element to a third capacitive element, the sampled voltage being the voltage across the third capacitive element after the transferring of the charge.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A power supply circuit comprising:
    a switched-mode power supply (SMPS) having an inductive element and a first switch coupled to the inductive element;
    a feedback path coupled between an output of the SMPS and a control input of the first switch; and
    a current limit circuit comprising:
        a first capacitive element;
        a charge circuit coupled to the first capacitive element;
        a first current source;
        a first resistive element coupled to the first current source, the first capacitive element being coupled to a node between the first resistive element and the first current source;
        a sample-and-hold circuit coupled to the first capacitive element; and
        a clamp circuit coupled between the sample-and-hold circuit and the feedback path.

2. The power supply circuit of claim 1, wherein the charging circuit is configured to charge the first capacitive element when the first switch is closed.

3. The power supply circuit of claim 1, further comprising a current sensing circuit configured to source a sense current across a second resistive element, the sense current being indicative of a current through the inductive element, wherein the first resistive element is a replica of the second resistive element.

4. The power supply circuit of claim 1, wherein the first current source is configured to set a limit for current flow through the inductive element.

5. The power supply circuit of claim 1, wherein the sample-and-hold circuit comprises:
   a second capacitive element;
   a second switch coupled between the first capacitive element and the second capacitive element;
   a third capacitive element coupled to the clamp circuit; and
   a third switch coupled between the second capacitive element and the third capacitive element.

6. The power supply circuit of claim 5, wherein the second capacitive element is coupled in parallel with the first capacitive element when the second switch is closed.

7. The power supply circuit of claim 1, wherein the clamp circuit comprises:
   an amplifier; and
   a transistor having a gate coupled to the output of the amplifier, a drain of the transistor being coupled to the feedback path.

8. The power supply circuit of claim 7, wherein the feedback path comprises an error amplifier coupled between the output of the SMPS and the control input of the first switch, and wherein a source of the transistor is coupled to an output of the error amplifier.

9. The power supply circuit of claim 8, wherein a positive input terminal of the amplifier is coupled to the sample-and-hold circuit, and wherein a negative input terminal of the amplifier is coupled to the source of the transistor.

10. The power supply circuit of claim 7, wherein the feedback path comprises an error amplifier coupled between the output of the SMPS and the control input of the first switch, and wherein the drain of the transistor is coupled to a supply node of the error amplifier.

11. The power supply circuit of claim 10, wherein a positive input terminal of the amplifier is coupled to the sample-and-hold circuit, and wherein a negative input terminal of the amplifier is coupled to the drain of the transistor.

12. The power supply circuit of claim 1, wherein the clamp circuit is configured to set a voltage associated with the feedback path based on a voltage at an output of the sample-and-hold circuit.

13. The power supply circuit of claim 12, wherein the feedback path comprises an error amplifier coupled between the output of the SMPS and the control input of the first switch, and wherein the voltage associated with the feedback path comprises an output voltage of the error amplifier.

14. The power supply circuit of claim 12, wherein the feedback path comprises an error amplifier coupled between the output of the SMPS and the control input of the first switch, and wherein the voltage associated with the feedback path comprises a supply voltage of the error amplifier.

15. The power supply circuit of claim 1, wherein the charging circuit comprises:
   a second current source; and
   a second switch coupled between the second current source and the first capacitive element.

16. The power supply circuit of claim 15, wherein the second switch is configured to be closed when the first switch is closed.

17. The power supply circuit of claim 15, wherein the current limit circuit further comprises a third switch coupled in parallel with the first capacitive element, and wherein the second switch is configured to be open when the third switch is closed.

18. The power supply circuit of claim 1, further comprising a current sensing circuit configured to sense a current through the inductive element, wherein the current limit circuit replicates a configuration of one or more components of the current sensing circuit.

19. A method for voltage regulation, comprising:
   generating, via a switched-mode power supply (SMPS), an output voltage at an output of the SMPS, wherein the SMPS comprises an inductive element and a first switch coupled to the inductive element, a feedback path being coupled between the output of the SMPS and a control input of the first switch; and
   limiting a current through the inductive element via a current limit circuit, wherein limiting the current comprises:
     charging a first capacitive element;
     sourcing, via a first current source, a current across a first resistive element, the first capacitive element being coupled to a node between the first resistive element and the first current source;
     sampling a voltage across the first capacitive element; and
     limiting a voltage associated with the feedback path based on the sampled voltage.

20. The method of claim 19, wherein the charging of the first capacitive element comprises charging the first capacitive element when the first switch is closed.

21. The method of claim 20, further comprising discharging the first capacitive element when the first switch is open.

22. The method of claim 19, further comprising sourcing a sense current across a second resistive element, the sense current being indicative of a current through the inductive element, wherein the first resistive element is a replica of the second resistive element.

23. The method of claim 19, wherein limiting the current through the inductive element further comprises setting the current to be sourced across the first resistive element to limit the current through the inductive element.

24. The method of claim 19, wherein the sampling of the voltage across the first capacitive element comprises:
   charging a second capacitive element based on the voltage across the first capacitive element; and
   after the charging of the second capacitive element, transferring a charge across the second capacitive element to a third capacitive element, the sampled voltage being the voltage across the third capacitive element after the transferring of the charge.

25. The method of claim 19, wherein the feedback path comprises an error amplifier coupled between the output of the SMPS and the control input of the first switch, and wherein limiting the voltage associated with the feedback path comprises limiting a supply voltage of the error amplifier.

26. The method of claim 19, wherein the feedback path comprises an error amplifier coupled between the output of the SMPS and the control input of the first switch, and wherein limiting the voltage associated with the feedback path comprises limiting an output voltage of the error amplifier.

27. An apparatus for voltage regulation, comprising:
   a switched-mode power supply (SMPS) configured to generate an output voltage at an output of the SMPS, wherein the SMPS comprises an inductive element and a first switch coupled to the inductive element, a feedback path being coupled between the output of the SMPS and a control input of the first switch; and
   means for limiting a current through the inductive element, wherein the means for limiting the current comprises:

means for charging a first capacitive element;

means for sourcing a current across a first resistive element, the first capacitive element being coupled to a node between the first resistive element and the means for sourcing;

means for sampling a voltage across the first capacitive element; and means for limiting a voltage associated with the feedback path based on the sampled voltage.

28. The apparatus of claim 27, wherein the means for charging the first capacitive element comprises means for charging the first capacitive element when the first switch is closed.

29. The apparatus of claim 27, further comprising means for sourcing a sense current across a second resistive element, the sense current being indicative of a current through the inductive element, wherein the first resistive element is a replica of the second resistive element.

30. The apparatus of claim 27, wherein the means for sampling the voltage across the first capacitive element comprises:

means for charging a second capacitive element based on the voltage across the first capacitive element; and means for transferring, after the charging of the second capacitive element, a charge across the second capacitive element to a third capacitive element, the sampled voltage being the voltage across the third capacitive element after the transferring of the charge.

* * * * *